US012812269B2

(12) United States Patent
Ayel

(10) Patent No.: US 12,812,269 B2
(45) Date of Patent: Nov. 24, 2026

(54) DEPTH PIXEL WITH SWITCHABLE INTEGRATION CAPABILITY

(71) Applicant: COMMISSARIAT A L'ENERGIE ATOMIQUE ET AUX ENERGIES ALTERNATIVES, Paris (FR)

(72) Inventor: François Ayel, Grenoble Cedex (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 19/080,080

(22) Filed: Mar. 14, 2025

(65) Prior Publication Data

US 2025/0294269 A1 Sep. 18, 2025

(30) Foreign Application Priority Data

Mar. 15, 2024 (FR) ....................................... 2402637

(51) Int. Cl.
*H04N 25/771* (2023.01)
*G01B 11/22* (2006.01)
(Continued)

(52) U.S. Cl.
CPC ........... *H04N 25/771* (2023.01); *G01B 11/22* (2013.01); *G01S 7/4913* (2013.01); *G01S 7/4915* (2013.01);
(Continued)

(58) Field of Classification Search
CPC .... H04N 25/771; H04N 25/705; H04N 25/53; G01S 17/894; G01S 7/4913; G01S 7/4915; G01B 11/22
See application file for complete search history.

(56) References Cited

U.S. PATENT DOCUMENTS 10,999,524 B1 * 5/2021 Duelli .................. G01S 17/894
2012/0312966 A1 12/2012 Suzuki et al.
2022/0113425 A1 * 4/2022 Ayel ...................... G01S 7/4914

FOREIGN PATENT DOCUMENTS

FR 3 138 963 A1 2/2024

OTHER PUBLICATIONS

French Preliminary Search Report Issued Jan. 23, 2025 in French Application 2402637 filed on Mar. 15, 2024, 2 pages (with English Translation of Category of Cited Documents).

(Continued)

*Primary Examiner* — Mishawn N. Hunter
(74) *Attorney, Agent, or Firm* — Oblon, McClelland, Maier & Neustadt, L.L.P.

(57) ABSTRACT

An image acquisition device provided with a set of depth pixels, each depth pixel comprising a read circuit associated with a photodetector (PD), the read circuit having a switching circuit (120) configured to:

adopt a first configuration so as to couple a first electrode (101*a*) of an integration capacitor (Ca) with a first read node ($N_{L1}$) and a second electrode (102*a*) of the integration capacitor (Ca) with a detection node ($N_D$), then, adopt a second configuration so as to couple the first electrode (101*a*) of the integration capacitor (Ca) with the detection node ($N_D$) and the second electrode (102*a*) of the integration capacitor ($C_{INT1}$) with the read node ($N_L$).

19 Claims, 9 Drawing Sheets

(51) Int. Cl.
*G01S 7/4913* (2020.01)
*G01S 7/4915* (2020.01)
*G01S 17/894* (2020.01)
*H04N 25/53* (2023.01)
*H04N 25/705* (2023.01)

(52) U.S. Cl.
CPC .......... *G01S 17/894* (2020.01); *H04N 25/53* (2023.01); *H04N 25/705* (2023.01)

(56) References Cited

OTHER PUBLICATIONS

Lange, et al., "Solid-State Time-of-Flight Range Camera", IEEE Journal of Quantum Electronics, vol. 37, No. 3, 2001, 8 pages.

* cited by examiner

DEPTH PIXEL WITH SWITCHABLE INTEGRATION CAPABILITY

TECHNICAL FIELD

The present application relates to the field of read circuits for scene depth image acquisition devices and more particularly those associated with unpinned photodiodes.

PRIOR ART

Image acquisition systems capable of acquiring depth information, for example such as systems using indirect time of flight (iTOF) detectors, are known.

An iTOF system generally comprises a circuit that controls a light source, for example a light-emitting diode (LED), which emits a light signal at a wavelength, for example in the near infrared spectrum, toward a scene. The light from a light signal reflected from this scene is captured by an image acquisition device. The image acquisition device also comprises pixels capable of receiving the light signal reflected by the image scene and detecting the phase of the signal received to form a depth image. These pixels are hereinafter referred to as "depth pixels". A series of acquisitions with a certain phase shift with respect to the light emitted and the luminous amplitude received at each time point is stored in dedicated storage elements.

A digital system determines, based on signals periodically amplitude-modulated and captured by the depth pixels of the image acquisition device, the corresponding distances of the objects in the image scene.

FIG. 1 is a graph representing, by a curve 3, an example of evolution, as a function of time, of the luminous intensity of a light signal emitted by a light-emitting diode toward an image scene, and, by a curve 5, an example of evolution, as a function of time, of a luminous intensity of a light signal received by one of the depth pixels of an image acquisition device.

The depth pixels are based on photodetectors used to detect the phase of the light signal received.

There is a phase shift $\Delta\varphi$ between the light signal emitted and the light signal received, which represents the time of flight of the light signal from the light-emitting diode to the image acquisition device via an object in the image scene reflecting the light signal.

An estimation of the distance d to the object in the image scene can be calculated using the equation:

$$d = \frac{c}{2f} \cdot \frac{\Delta\varphi}{2\pi}$$

where c is the speed of light, f the frequency of the light signal.

The phase shift $\Delta\varphi$ can be estimated based on a sampling of the signal captured by one or more depth pixels during at least three windows also referred to as distinct sampling phases, preferably during four distinct sampling windows or phases, during each light signal period.

An integration on a large number of periods in particular greater than 10,000 is typically carried out. For example, each sampling window or phase has a duration of up to a quarter of the light signal period. These sampling phases typically each have the same duration and the four sampling phases have a total cycle time equal to the light signal period.

Charge samples are stored in storage elements, for example in the form of capacitors.

Based on integrated samples EC0, EC1, EC2 of the light signal, and for a sinusoidal light wave, the phase shift $\Delta\varphi$ of the light signal can, in a particular case of use of 3 storage elements, be given by the following formula:

$$\Delta\varphi = \arctan\sqrt{3}\,(EC2 - EC1)/[(EC0 - EC1) + (EC0 - EC2)].$$

A technique based on the detection of four samples EC0, EC1, EC2, and EC3 according to four C0 phases, C1, C2, and C3 per period is described in more detail in the publication by R. Lange and P. Seitz entitled "Solid-state TOF range camera", IEEE J. on Quantum Electronics, vol. 37, No. 3, March 2001.

It is thus possible to organize the detection differently using 4 storage elements. In this case, the phase shift is given by the following formula:

$$\Delta\varphi = \arctan\left[(EC3 - EC1)/(EC0 - EC2)\right].$$

To determine the phase shift $\Delta\varphi$ between the light signal emitted and the light signal received, the light signal received is sampled by transferring, successively and at regular intervals, photogenerated charges in a photodetector during a first sampling phase C0, photogenerated charges in the same photodetector or in another photodetector during a second sampling phase C1 following the first phase, photogenerated charges during a third sampling phase C2 following the second phase, and photogenerated charges during a fourth sampling window C3 following the third phase. This sequence of four sampling phases is repeated a substantial number of times, for example 100,000 times during a so-called "integration" period before the signals obtained are read by an output circuit.

When a photodiode is pinned and has a fully depleted and charge-free zone, this zone is presented in the form of a potential well which allows a certain number of charges to be retained, typically between several tens and several thousand depending on the characteristics of the diode pending their transfer via transfer gates.

Pinned photodiode depth pixels including transfer gates and a plurality of storage elements per pixel are known.

The use of pinned diodes for a depth pixel is desired but is not always possible.

For example, in the case of a III-V material such as InGaAs, which is particularly adapted to infrared and therefore to the wavelengths routinely used for iTOF measurements, the implementation of a pinned photodiode is difficult.

However, retaining the biasing of a photodiode is especially critical as the photodiode is of the unpinned type. This biasing should preferably be kept constant at the desired value, in order to retain good performances in terms of gain and minimize dark current.

To bias in an appropriate way and make it possible to retain a fixed biasing on the photodetector, a cascode type structure can be envisaged in the read circuit. Such a structure is typically formed of a transistor wherein the source is connected to the photodetector. However, it is not adapted for certain applications, especially those requiring high operating frequencies, for example greater than 100 MHz. Active cascode read circuits are known, but their bandwidth remains limited and it remains difficult to obtain a good compromise between consumption and detection precision with such circuits. Other structures helping retain biasing are known.

French patent application no 2208374 filed on Aug. 18, 2022 with the French National Institute of Industrial Property (INPI) provides a read circuit addressing such a problem.

It is sought to improve such a read circuit, in particular in terms of current dynamics and/or signal-to-noise ratio and/or to allow a simplification of the digital processing required downstream.

DESCRIPTION OF THE INVENTION

The present invention provides, according to one aspect, a device for acquiring depth images of a scene by detecting a reflected light signal corresponding to the reflection on the scene of an incident light signal, in particular in the near infrared, the acquisition device being provided with a set of depth pixels, each depth pixel of the set comprising a read circuit associated with a photodetector, the read circuit including a detection node to which the photodetector is connected, the read circuit being provided with:

- a storage element including an integration capacitor configured to acquire samples of charges from the photodetector during sampling phases performed during an integration period including repeated sequences of successive charge sampling phases,
- at least one amplifier stage including at the input, the detection node coupled with the photodetector and at the output, a read node capable of being coupled with an external reading device and common to the set of depth pixels,
- at least a first pixel of said set of depth pixels being further provided with a switching circuit including switch elements and configured to:
- during sampling phases of the integration capacitor of the first pixel, adopt a first configuration so as to couple a first electrode of the integration capacitor with the first read node and a second electrode of the integration capacitor with the detection node, then,
- during other sampling phases of the integration capacitor of the first pixel, adopt a second configuration so as to couple the first electrode of the integration capacitor with the detection node and the second electrode of the integration capacitor with the read node,
- or
- during sampling phases of the capacitor, adopt a first configuration so as to couple a first electrode of the integration capacitor with the read node and a second electrode of the integration capacitor with the detection node, then,
- during other sampling phases of the capacitor, adopt a second configuration so as to couple the first electrode of the integration capacitor with the detection node and the second electrode of the integration capacitor with a second read node at the output of a second amplifier stage of the read circuit, the second amplifier stage including at the input, the detection node and at the output the second read node, the second read node also being capable of being coupled with the external reading device.

Thus, either a capacitor reversal in an amplification branch, or a capacitor exchange between amplification branches, is carried out, in both cases, to gain in signal-to-noise ratio.

According to a preferred embodiment, the photodetector is an unpinned photodiode. This unpinned photodiode can in particular be based on a Ill-V material. This III-V material can advantageously be InGaAs.

According to a first embodiment, the integration capacitor is a first integration capacitor and the amplifier stage is a first amplifier stage, the read circuit further comprising:

- a second integration capacitor,
- a second amplifier stage, the second amplifier stage including at the input, the detection node coupled with the photodetector and at the output, the second read node.

In this case, advantageously, in the first configuration, the first electrode of the first integration capacitor can be coupled with the first read node and the second electrode of the integration capacitor coupled with the detection node, and in the second configuration, the first electrode of the first integration capacitor can be coupled with the detection node and the second electrode of the first integration capacitor is coupled with the first read node, the switching circuit being configured to:

- during sampling phases of the second integration capacitor, couple a first electrode of the second integration capacitor with the second read node and a second electrode of the second integration capacitor with the detection node, then
- during other sampling phases of the second integration capacitor, couple the first electrode of the second integration capacitor with the detection node and the second electrode of the second integration capacitor with the second read node.

Advantageously, the repeated sequences of successive sampling phases include a repetition of a first sampling sequence followed by a repetition of a second sampling sequence, each of the first sequence and second sequence including a first sampling phase, a second sampling phase, a third sampling phase, and a fourth sampling phase, the first sampling phase of the first sequence and the third sampling phase of the first sequence being performed respectively by the first integration capacitor of the first pixel and by the second integration capacitor of the first pixel, the first sampling phase of the second sequence and the third sampling phase of the second sequence being performed respectively by the first integration capacitor of the first pixel and by the second integration capacitor of the first pixel,

- the second sampling phase and the fourth sampling phase of the first sequence and of the second sequence being performed by at least one read circuit of at least one other depth pixel of said set.

According to a second embodiment, the read circuit is provided with a single integration capacitor and the sampling phases are sampling phases of this single integration capacitor during which the first electrode of this integration capacitor is coupled with the read node and the second electrode of this integration capacitor is coupled with the detection node, the other sampling phases being sampling phases during which the first electrode of the integration capacitor is coupled with the detection node and the second electrode of the integration capacitor is coupled with the read node.

Advantageously, according to a particular aspect of this second embodiment, the repeated sequences of successive sampling phases can include a repetition of a first sampling sequence then a repetition of a second sampling sequence, the first sampling sequence and the second sampling sequence each including a series of a first sampling phase, a second sampling phase, a third sampling phase, and a fourth sampling phase, the first sampling phase, the second sampling phase, the third sampling phase, the fourth sampling phase having equal durations, the first sampling phase and the second sampling phase of the first sequence being performed by the first pixel in the first configuration of the switching circuit, the third sampling phase and the fourth sampling phase of the second sequence being performed by the first pixel in the first configuration of the switching circuit, the third sampling phase and the fourth sampling phase of the first sequence, the first sampling phase and the second sampling phase of the second being performed by at least one read circuit of at least one other depth pixel of said set.

Alternatively, the repeated sequences of successive sampling phases can include a repetition of a first sampling sequence then a repetition of a second sampling sequence, the first sampling sequence and the second sampling sequence each including a series of a first sampling phase, a second sampling phase, a third sampling phase, and a fourth sampling phase, the first sampling phase, the second sampling phase, the third sampling phase, the fourth sampling phase having equal durations,

- the first sampling phase of the first sequence being performed by the first pixel,
- the third sampling phase of the second sequence being performed by the first pixel,
- the second sampling phase, the third sampling phase and the fourth sampling phase of the first sequence, the first sampling phase, the second sampling phase and the fourth sampling phase of the second sequence being performed by at least one read circuit of at least one other depth pixel of said set.

Advantageously, the read circuit of the first pixel further comprises a biasing reset unit serving to biase the photodetector, with a rebiasing switch configured to, during biasing reset phases of said photodetector, couple the biasing reset unit with the photodetector so as to apply a biasing potential thereto, and to, during sampling phases performed by the first pixel, uncouple the photodetector from the biasing reset unit.

Advantageously, the switching circuit can comprise:

- a first switch element between a first electrode of the integration capacitor and the read node;
- a second switch element between a second electrode of the integration capacitor and the detection node;
- a third switch element between the second electrode of the integration capacitor and the detection node;
- a fourth switch element between the first electrode of the first capacitor and the read node.

According to a third embodiment, the integration capacitor is a first integration capacitor and the amplifier stage is a first amplifier stage, the read circuit further comprising:

- a second integration capacitor,
- a second amplifier stage, the second amplifier stage including at the input, the detection node coupled with the photodetector and at the output, the second read node, during the sampling phases, the first electrode of the first integration capacitor being coupled with the first read node and the second electrode of the first integration capacitor being coupled with the detection node, and during the other sampling phases, the first electrode of the first integration capacitor being coupled with the detection node and the second electrode of the first integration capacitor being coupled with the first read node,
- the switching circuit being configured to:
  - during sampling phases of the second integration capacitor, couple a first electrode of the second integration capacitor with the second read node and a second electrode of the second integration capacitor with the detection node, then
  - during other sampling phases of the second integration capacitor, couple the first electrode of the second integration capacitor with the detection node and the second electrode of the second integration capacitor with the second read node.

Advantageously, the repeated successive sampling phase sequences include a first sampling sequence then a second sampling sequence, the first sampling sequence and the second sampling sequence each including a series of a first sampling phase, a second sampling phase, a third sampling phase, and a fourth sampling phase, the first sampling phase, the second sampling phase, the third sampling phase, the fourth sampling phase having equal durations,

- the first sampling phase and the second sampling phase of the first sequence being performed by the capacitor of the first pixel, the third sampling phase and the fourth sampling phase of the first sequence being performed by the second capacitor of the first pixel.

According to a particular embodiment, the second sampling phase and the third sampling phase of the first sequence can be performed by the capacitor of the second pixel, the fourth sampling phase and the first sampling phase of the second sequence being performed by the capacitor of the second pixel.

The switching circuit can include:

- a switch element between the first electrode of the first capacitor and the first read node;
- a switch element between the second electrode of the first capacitor and the detection node;
- a switch element between the first electrode of the second capacitor and the first read node;
- a switch element between the second electrode of the second capacitor and the detection node;
- a switch element between the first electrode of the first capacitor and the detection node;
- a switch element between the second electrode of the first capacitor and the second read node;
- a switch element between the first electrode of the second capacitor and the detection node;
- a switch element between the second electrode of the second capacitor and the first read node.

Advantageously, the amplifier stage is formed of:

- a first transistor provided with a gate connected to the photodetector and an electrode, in particular a drain electrode, connected to the read node
- a second transistor mounted as a current source and having a common electrode with the first transistor.

The depth pixels can have an array arrangement, the device further comprising an external biasing unit common to the depth pixels of the same row, in particular a horizontal row or a line of depth pixels, the external biasing unit comprising a circuit portion mounted in current mirror with said second transistor.

Advantageously, the read circuit can further be provided with a reset switch in parallel with the feedback branch, provided to, when it is closed, reset the integration capacitor prior to the integration period, said reset switch being open during the integration period.

BRIEF DESCRIPTION OF THE DRAWINGS

The present invention will be better understood on reading the description of given exemplary embodiments, purely for indicative and non-limiting purposes, with reference to the appended drawings wherein.

Identical, similar or equivalent parts of the different figures bear the same numerical references so as to facilitate the transition from one figure to another.

The individual parts shown in the figures are not necessarily shown according to a uniform scale, to make the figures more readable.

DETAILED DISCLOSURE OF PARTICULAR EMBODIMENTS

Figure 1:
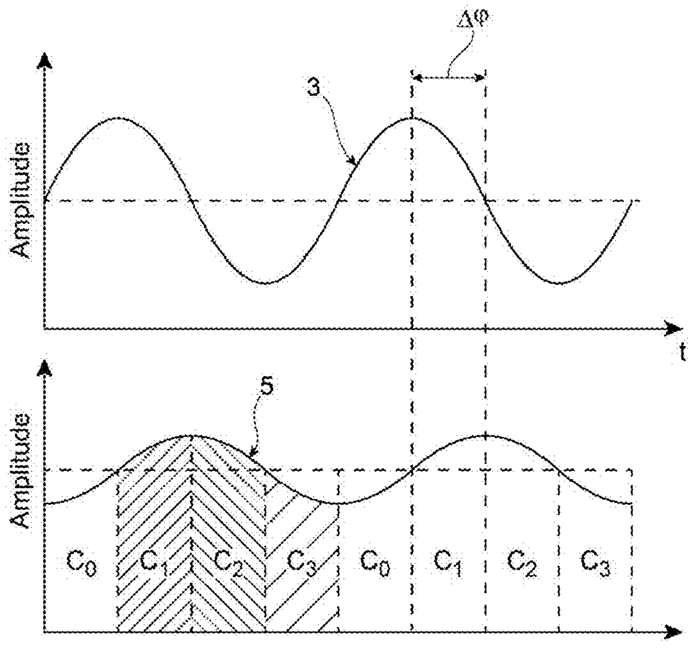
FIG. 1 serves, through examples of respectively emitted and received signals, to illustrate a sequence of several sampling phases implemented repeatedly within an iTOF system during an integration period.
Figure 2:
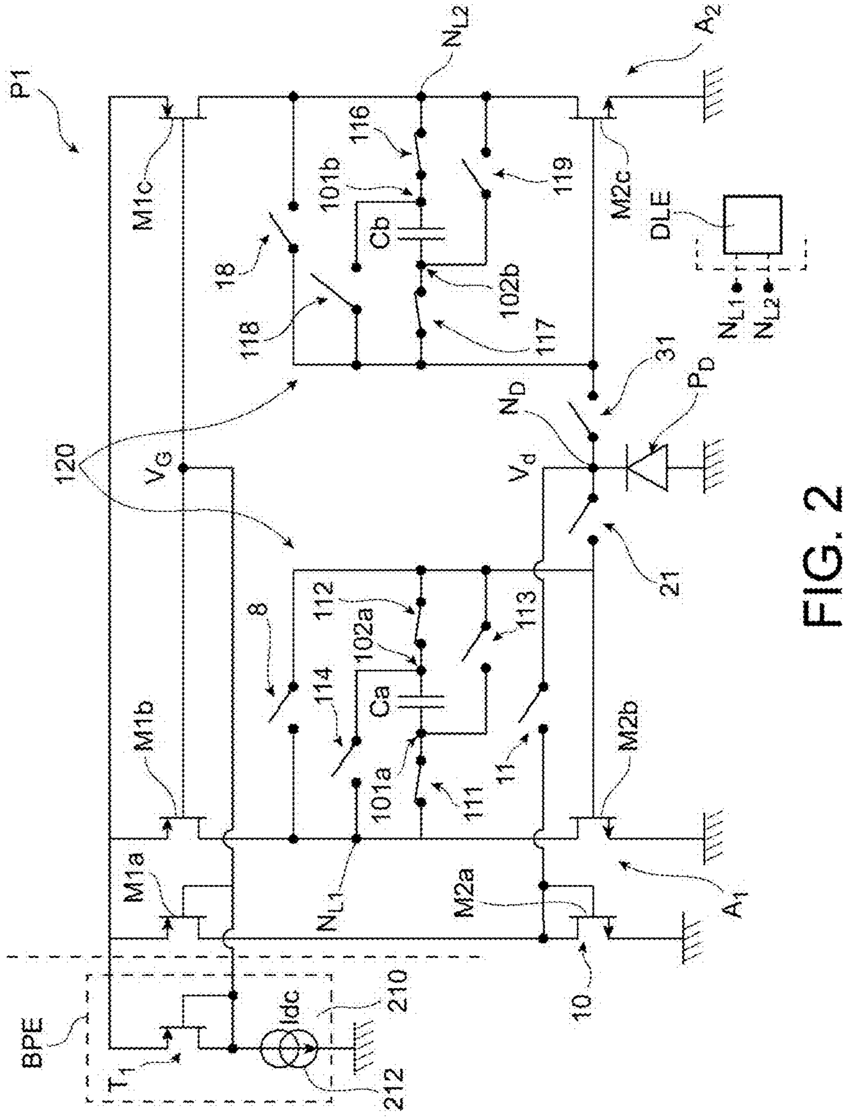
FIG. 2 illustrates a first read circuit according to the invention of a depth pixel provided with integration capacitors with a switching circuit making it possible to switch, from one phase to another, the connections of each of its integration capacitors.

Reference is now made to FIG. 2 wherein an electronic diagram of an example of a depth pixel $P_1$ of an image sensor configured to acquire depth images of a scene is given.

The pixel $P_1$ comprises a photodetector PD such as a photodiode, in particular an unpinned photodiode. The pixel $P_1$ is part of a set of pixels of the sensor, typically arranged in an array and preferably having an identical composition to that of the pixel $P_1$. The photodiode can in particular be based on at least one semiconductor material adapted for operation in the infrared or near infrared range, for example in a range between 700 nm and 1100 nm, in particular a semiconductor of the III-V group such as for example InGaAs or InGaN, or a II-VI material such as for example ZnS. The photodiode here has its cathode connected to a detection node $N_D$ and its anode set to a low potential, in particular a reference potential such as the ground GND.

The photodetector PD is associated with and connected to a read circuit integrated in the pixel $P_1$. This read circuit is here provided with a first storage element equipped with a first integration capacitor Ca provided to collect charges, and in particular to acquire charge samples from the photodetector PD photogenerated by detection of a reflected light signal, during so-called “sampling” phases.

The first integration capacitor Ca is here arranged in a feedback branch between an input and an output of an amplifier stage A1 of a capacitive transimpedance amplifier (CTIA) structure. The input of the amplifier stage A1 here corresponds to the detection node $N_D$ whereas the output of the amplifier A1 corresponds to a first read node $N_{L1}$, itself coupled with an external reading device DLE (shown schematically in this figure) of the samples, this external reading device DLE being typically shared by a set of pixels of the array to which the pixel $P_1$ belongs.

Such an external reading device DLE with respect to the pixel $P_1$ can typically comprise a common circuit to pixels of the same column (i.e. vertical row) of pixels and can for example be provided with a correlated double-sampling (CDS) stage.

An example of an external reading device DLE is given in French patent application no 2208374 filed on Aug. 18, 2022 with the French National Institute of Industrial Property (INPI).

The amplifier stage A1 is produced with a reduced number of transistors, here two transistors $M_{1b}$, $M_{2b}$, which makes it possible to limit the size of the read circuit.

A first transistor $M_{2b}$ of the amplifier stage A1, NMOS type in the example illustrated, has a low potential source electrode and a drain electrode connected to the integration capacitor Ca as well as a second transistor $M_{1b}$, PMOS type in the example illustrated, forming a current source. For this, the second transistor $M_{1b}$ can be mounted in current mirror with a circuit portion 210 belonging to an external biasing unit BPE, which is not part of the read circuit and is arranged outside the pixel $P_1$. This circuit portion 210 can be formed of a current source 212 and a transistor $T_1$ wherein the gate and drain are connected to the gate of the second transistor $M_{1b}$. The external biasing unit BPE is typically a circuit located at the edge of the set or array of pixels to which the pixel $P_1$.

In the particular exemplary embodiment illustrated in FIG. 2, the pixel $P_1$ is furthermore provided with a second storage element equipped with a second integration capacitor Cb. Thus, in this example, there are two integration capacitors Ca, Cb per depth pixel. The second integration capacitor Cb is here provided to acquire charge samples, in particular charges from the photodetector PD during sampling phases. The second integration capacitor Cb is arranged in a feedback branch between an input and an output of a second amplifier stage A2 of the capacitive transimpedance amplifier (CTIA) structure. The input of the amplifier stage A2 here corresponds to the detection node $N_D$ whereas the output of the amplifier A2 corresponds to a second read node $N_{L2}$, itself coupled with the aforementioned external reading device DLE with which the first read node $N_{L1}$ is also coupled.

This second amplifier stage A2 typically has an identical arrangement to that of the first amplifier stage A1.

The second amplifier stage A2 is also produced with a reduced number of transistors, here two transistors M1*c*, M2*c*. The second amplifier stage A2 is equipped with a transistor M2*c*, here NMOS type, wherein the gate is coupled with the photodetector PD. The transistor M2*c*, NMOS type in the example illustrated, has a reference potential source electrode and a drain electrode connected to the integration capacitor Cb and to a second transistor M1*c*, PMOS type in the example illustrated, forming a current source. For this, the transistor M1*c* can be mounted in current mirror with the same circuit portion belonging to the same external biasing unit BPE.

The read circuit is here also provided with a first sampling switch 21 arranged between the first integration capacitor Ca and the photodetector PD, and a second sampling switch 31 arranged between the second integration capacitor Cb and the photodetector PD.

Reset switches, 8, 18, are provided in parallel, respectively of the capacitor Ca and the capacitor Cb. These reset switches 8, 18, make it possible to reset the integration capacitors Ca and the capacitor Cb at the start of an integration period during which several repeated sequences of distinct sampling phases C0, C1, C2, C3 are performed by one or more storage elements of one or more distinct depth pixels of the image acquisition device.

This integration period includes a substantial number of repeated sampling phase sequences, with typically between several hundred and several million sampling phases carried out in order to implement a depth measurement.

Each sequence typically includes a series of sampling phases, for example four phases $C_0$, $C_1$, $C_2$, $C_3$, preferably of equal durations. Thus, a first sampling phase $C_0$, a second sampling phase $C_1$ offset from the first sampling phase $C_0$ according to a constant offset or phase shift, a third sampling phase $C_2$ offset from the second sampling phase and the third sampling phase according to a constant offset or phase shift and a fourth sampling phase $C_3$ offset from the second sampling phase and the third sampling phase according to a constant offset or phase shift are carried out.

A sequence of four sampling phases $C_0$, $C_1$, $C_2$, $C_3$ is thus typically repeated a given number of times for example greater than 10,000 and for example between 10,000 and 100,000.

In order to ensure that the biasing of the photodetector PD is retained during the integration period, the pixel $P_1$ is, in this particular embodiment, provided with a biasing reset unit 10. A rebiasing switch 11 is then set to an ON (i.e. closed) state during biasing reset phases annotated as RAZ, which allows the application of a biasing potential to the detection node $N_D$.

These biasing reset phases RAZ are here performed between sampling phases implemented by the first capacitor Ca and/or the second capacitor Cb.

During sampling phases implemented by the first capacitor Ca, the rebiasing switch 11 is set to an OFF (i.e. open) state to decouple the photodetector PD from the biasing reset unit 10 and the sampling switch 31 is set in an OFF state in order to decouple the photodetector PD from the second integration capacitor Cb, whereas the first sampling switch 21, for example formed of at least one transistor, is set to ON (i.e. closed) in order to couple the photodetector PD with the first integration capacitor Ca.

During sampling phases implemented by the second capacitor Cb, the rebiasing switch 11 is set to an OFF (i.e. open) state to decouple the photodetector PD from the biasing reset unit 10 and the sampling switch 21 is set to an OFF state in order to decouple the photodetector PD from the first integration capacitor Ca, whereas the second sampling switch 31, for example formed of at least one transistor, is set to ON (i.e. closed) in order to couple the photodetector PD with the second integration capacitor Cb.

The rebiasing reset unit 10 is here formed of a transistor M1*a*, PMOS type in the example illustrated, mounted in current mirror with the circuit portion 210 belonging to the external biasing unit BPE.

The transistor M1*a* of the biasing reset unit 10 and the second transistor M1*b* of the amplifier stage A1 have their gates connected to each other and set to a potential VG required by the external biasing unit BPE, their respective sources being set to a high supply potential, for example VDD.

The transistor M1*a* of the biasing reset unit 10 is coupled with another transistor M2*a*, NMOS type in this example, wherein the gate and drain are connected. The rebiasing switch 11 controlled by a biasing reset signal RAZ is here arranged between the gate of the transistor M2*c* and the detection node $N_D$. During biasing reset phases RAZ, the cathode of the photodiode PD is coupled with the gate of the transistor M2*a*.

In particular, the read circuit of FIG. 2 here has the particularity of being provided with a switching circuit 120 including switch elements 111, 112, 113, 114, 116, 117, 118, 119 for example each formed of one or more transistors.

A first group of switches 111, 112, 113, 114 is here associated with the first integration capacitor Ca whereas a second group of switches 116, 117, 118, 119 is here associated with the second integration capacitor Cb.

The first group of switch elements comprises:

- a first switch element 111 between a first electrode 101*a* of the first capacitor Ca and the first read node $N_{L1}$;
- a second switch element 112 between a second electrode 102*a* of the first capacitor Ca and the detection node $N_D$;
- a third switch element 113 between the first electrode 101*a* of the first capacitor Ca and the detection node $N_D$;
- a fourth switch element 114 between the second electrode 102*a* of the first capacitor Ca and the first read node $N_{L1}$.

The second switch element 112 can be connected to the detection node $N_D$ via the sampling switch 21 when this switch 21 is closed (ON).

The third switch element 113 can be connected to the detection node $N_D$ via the sampling switch 21 when this switch 21 is closed (ON).

The second group of switch elements comprises:

- a first switch element 116 between a first electrode 101*b* of the second capacitor Cb and the second read node $N_{L2}$;
- a second switch element 117 between a second electrode 102*b* of the second capacitor Cb and the detection node $N_D$;
- a third switch element 118 between the first electrode 101*b* of the second capacitor Cb and the detection node $N_D$;
- a fourth switch element 119 between the second electrode 102*b* of the second capacitor Cb and the second read node $N_{L2}$.

The second switch element 117 can be connected to the detection node $N_D$ via the sampling switch 31 when this switch 31 is closed (ON).

The third switch element 118 can be connected to the detection node $N_D$ via the sampling switch 31 when this switch 31 is closed (ON).

The switching circuit 120 is configured to, during at least one first sampling phase performed by the first capacitor Ca, adopt a first configuration, with the first and second switches 111, 112 closed (i.e. ON) whereas the third and fourth switches 113, 114 are open (i.e. OFF) so as to couple the first electrode 101*a* of the integration capacitor Ca with the first read node $N_{L1}$ and the second electrode 102*a* with the detection node $N_D$, then, during at least a second sampling phase performed by the first capacitor Ca, adopt a second configuration, with the switches 111, 112 open (i.e. OFF) whereas the switches 113, 114 are closed (i.e. ON) so as to couple the first electrode 101_a_ of the integration capacitor Ca with the detection node $N_D$ and the second electrode 102_a_ of the integration capacitor Ca with the read node $N_{L1}$.

"Sampling" phase means here and throughout the description a phase during which a capacitor is connected to the detection node via its associated sampling switch 21 or 31, in order to either perform the acquisition of samples of a reflected signal when a light signal is emitted by the acquisition device or perform a charge collection to perform a calibration or measurement without a light signal being emitted by the acquisition device.

Such a capacitor reversal can make it possible to obtain samples +EC and −EC of opposite signs and to compensate for any presence of parasitic light and prevent its storage and thus gain in signal-to-noise ratio. It also helps to prevent capacitor saturation and improves the dynamics of processed current from the photodetector PD.

With a pixel as described above, sampling phases can also be carried out without an emitted light signal and which are provided to make it possible to evaluate an offset due to an offset in properties between the different structures described, in particular the amplifiers and the voltage reference M2_a_. A positively stored offset during the first sampling phase is therefore subtracted during the second sampling phase.

The switching circuit is also configured to, during at least a first sampling phase of the second capacitor Cb, adopt a configuration, with the switches 116, 117 closed (i.e. ON) whereas the switches 118, 119 are open (i.e. OFF) so as to couple the first electrode 101_b_ of the integration capacitor Cb with the second detection node $N_D$ and the second electrode 102_b_ with the read node $N_{L2}$, then, during at least a second sampling phase of the second capacitor Cb, adopt another configuration, with the switches 116, 117 open (i.e. OFF) whereas the switches 118, 119 are closed (i.e. ON) so as to couple the first electrode 101_b_ of the integration capacitor Cb with the read node $N_{L2}$ and the second electrode 102_b_ of the integration capacitor Cb with the detection node $N_D$.

Similarly, sampling phases can be carried out without an emitted light signal and which are provided to make it possible to evaluate an offset stored in the second capacitor Cb.

Such a switching circuit makes it possible to reverse the polarity, in other words alternate each capacitor Ca, Cb during the integration period. This makes it possible to compensate for any faults associated with a possible imbalance between transistors.

During the reset phases RAZ, the gate voltage of the transistor M2_a_ of the rebiasing unit serves as a reset potential for the photodiode PD. At the start of acquisition, for example with the second amplifier A2 and its transistor M2_c_, an electrical balance is supposed to be established such that the gate potential on this transistor M2_c_ corresponds to the potential of the transistor M2_a_. Under effects of any undesired differences in properties ("mismatch") between the different transistors, the two gate potentials, that of transistor M2_a_ and that of transistor M2_c_, may be different. This might lead to the possible integration of a parasitic signal. Furthermore, the value of this signal is potentially different when integrated with the second amplifier and its associated transistor M2_b_, which might tend to degrade the signal-to-noise ratio. This degradation is not identical for all amplifiers and is therefore difficult to compensate subsequently with a differential structure.

Phase alternation as described above can make it possible to remedy this problem.

Figure 3:
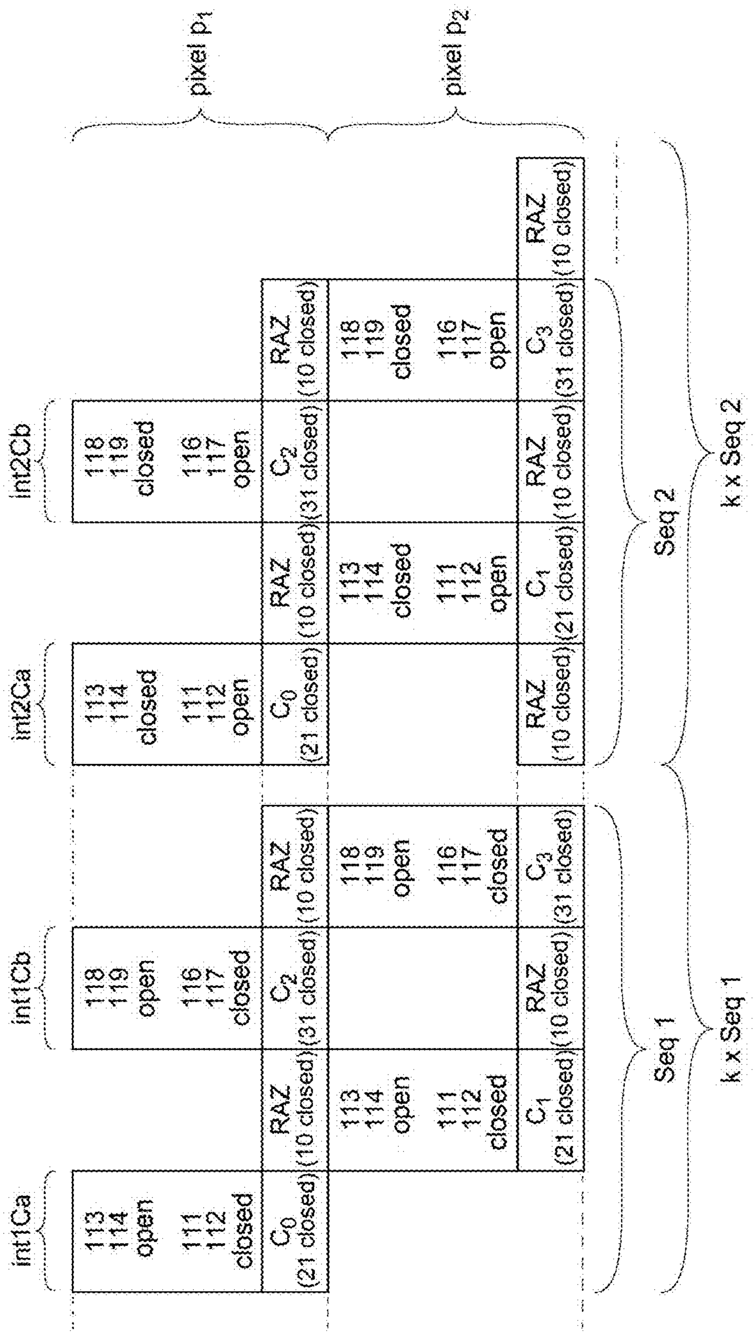
FIG. 3 illustrates an operating mode of the first circuit during successive sampling phases.

An integration period comprising a repeated series of k times a first sampling sequence seq1 then k times a second sampling sequence seq2, is illustrated schematically in FIG. 3 and serves to illustrate a particular operating mode of the read circuit of the pixel p1 described above in relation to FIG. 2 and of a second pixel p2 wherein the read circuit is identical and belongs to the same set of pixels as the first pixel p1. Each of the first sequence Seq1 and second sequence Seq2 is successively composed of a first sampling phase C0, a second sampling phase C1, a third sampling phase C2, and a fourth sampling phase C3.

The first sampling phase C0 of the first sequence Seq1 is performed by the first integration capacitor Ca of the first pixel p1.

The second sampling phase C1 of the first sequence Seq1 is then performed by the second pixel p2. During this second sampling phase C2, a biasing reset phase RAZ of the photodetector PD of the first pixel p1 can be performed.

Then, the third sampling phase C2 of the first sequence Seq1 is performed by the second integration capacitor Cb of the first pixel p1.

Then, the fourth sampling phase C3 of the first sequence Seq1 is performed by the second pixel p2. Here again, a biasing reset phase RAZ of the photodetector PD is implemented between the two samplings performed by the same pixel.

Then, the first sampling phase C0 of the second sequence Seq2 is performed by the first integration capacitor Ca of the first pixel p1.

The second sampling phase C1 of the second sequence Seq2 is then performed by the second pixel p2.

Then, the third sampling phase C2 of the second sequence Seq2 is performed this time by the second integration capacitor Cb of the first pixel p1.

The fourth sampling phase C3 of the second sequence Seq2 is then performed by the second pixel p2.

Thus, between the repetition of k times the first sequence seq1 then of k times the second sequence seq2, each of the capacitors Ca, Cb is alternated to make it possible to compensate for any imbalance between transistors.

The first sequence seq1, and the second sequence seq2 are each repeated a substantial number k during an integration period for example where k is between 5000 and 50,000 times.

In order in particular to prevent offset measurement phases causing amplifier saturation, it can be provided to alternate offset measurement phases (without light signal) and light signal sampling periods, several times, consecutively and over shorter durations.

In the exemplary embodiment described above, a biasing reset phase RAZ of the photodetector PD is typically provided between two consecutive sampling phases carried out by the same capacitor Ca or Cb.

Such a reset can prove to be optional, particularly if the durations of the sampling phases are adapted.

Instead of performing sampling phases one after the other wherein the duration corresponds to the collection of a sample, it can be provided to carry out sampling over two consecutive periods designated for sample collection. It can then be sufficient to perform a mathematical operation (addition and subtraction) to obtain sought values making it possible to arrive at a phase shift $\Delta\varphi$ formula as discussed above.

Figure 4:
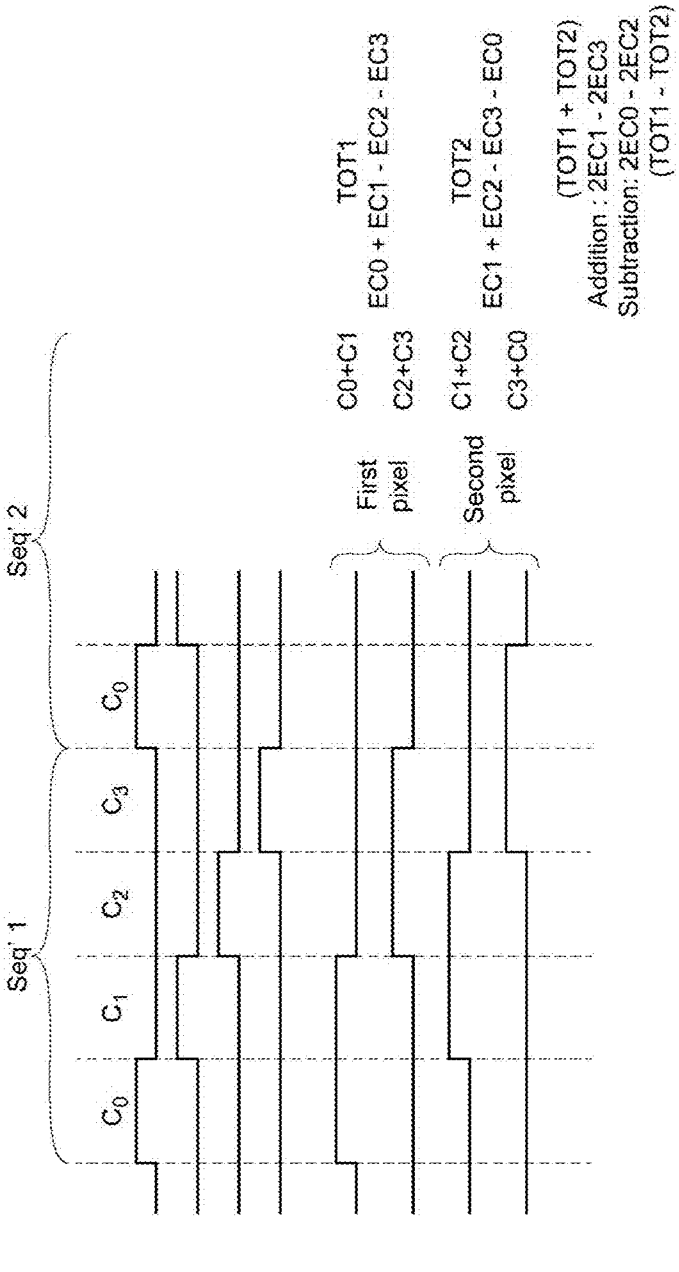
FIG. 4 illustrates another operating mode of a depth image acquisition device during which, during an integration period, two depth pixels concurrently carry out sampling phases whereas other sampling phases are carried out exclusively by the first pixel or by the second pixel.

A series of successive sequences seq'1, seq'2 using this principle is given in FIG. 4 and thus serves to illustrate another operating mode of read circuits of a first pixel p1 and of a second pixel p2. In order to save space in particular, these circuits can be devoid of biasing reset units RAZ of the photodetector PD.

Each of the first sequence Seq'1 and second sequence Seq'2 is successively composed of a first sampling phase C0, a second sampling phase C1, a third sampling phase C2, and a fourth sampling phase C3.

The first sampling phase C0 and the second sampling phase C1 of the first sequence Seq'1 are performed by an integration capacitor Ca or Cb of a first pixel.

The third sampling phase C2 and the fourth sampling phase C3 of the first sequence Seq'1 are performed by the other integration capacitor Cb or Ca of the first pixel, for example the integration capacitor Cb when the first sampling phase and the second phase have been performed by the integration capacitor Ca.

During this same first sequence Seq'1, the second sampling phase and the third sampling phase are performed by an integration capacitor Ca of a second pixel, the fourth sampling phase of the first sequence Seq1 and the first sampling phase of the second sequence being performed by the other integration capacitor Cb of the second pixel.

Thus, the first pixel makes it possible to collect samples |EC0+EC1| then samples |EC2+EC3| during the first Seq'1.

The second pixel makes it possible to collect samples |EC1+EC2| during the first Seq'1 then samples |EC3+EC0| during the first Seq'1 then the second Seq'2.

By inverting or reversing capacitors by modifying the connection of the electrodes of each with respect to the detection node and the read node, a sample total TOT1 for the first pixel equal to EC0+EC1−EC2−EC3 following the two sequences Seq1, Seq2 and for the second pixel following the first phase C0 of the second sequence Seq2 a total TOT2 of samples EC1+EC2−EC3−EC0 can be obtained. Adding these two totals gives TOT1+TOT2=2*EC1+2*EC3. Subtracting these two totals gives TOT1−TOT2=2*EC1−2*EC3. These operations make it possible to arrive at a phase shift according to a formula as given above.

Figure 5A:
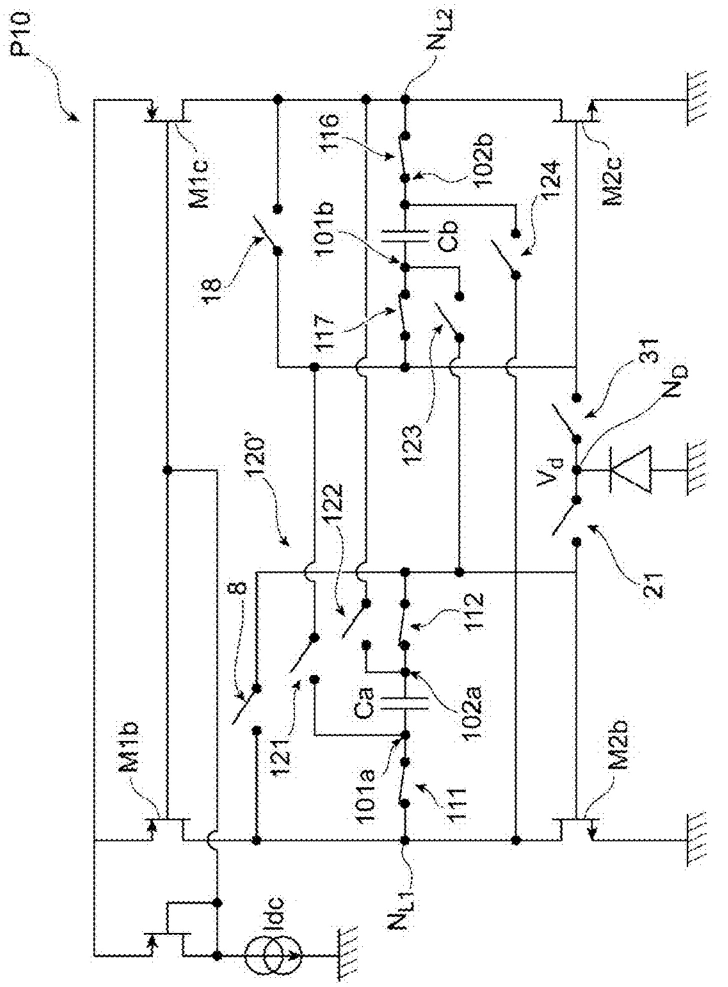
FIGS. 5A and 5B illustrate different configurations of the switching circuit of a second read circuit according to the invention of a depth pixel and wherein it is possible to switch the amplification stages with which the integration capacitors are associated.
Figure 5B:
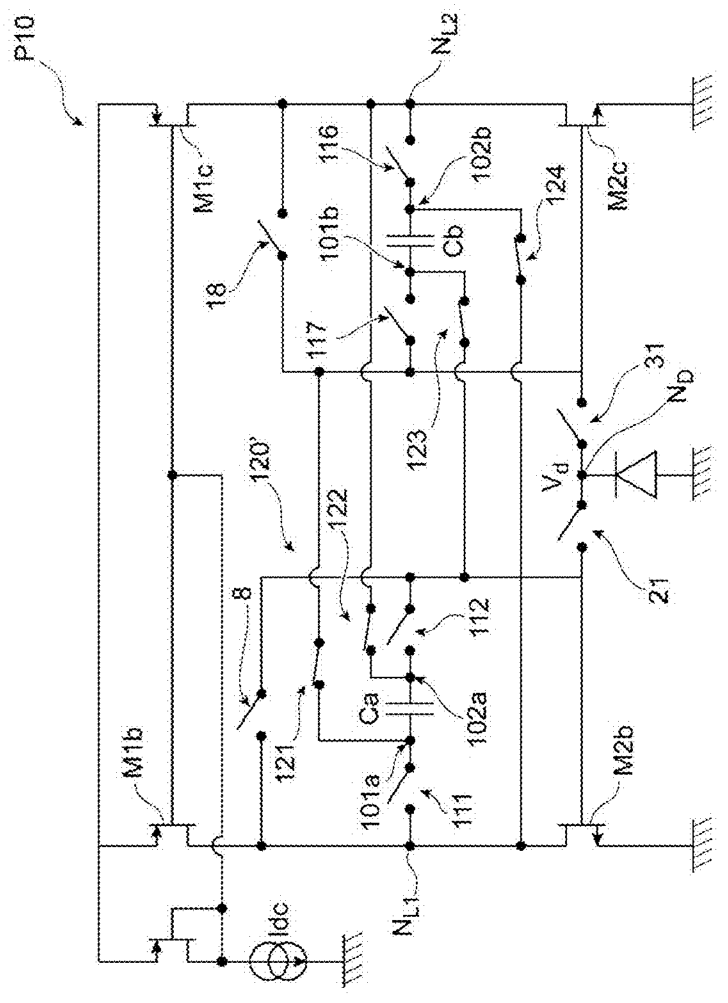

In FIGS. 5A and 5B, another example of a depth pixel $P_{10}$, capable of adopting an operating mode as described above in relation to FIG. 4 is given and differs from that described above in relation to FIG. 2, in that its read circuit is devoid of a biasing reset unit RAZ of the photodetector PD.

The arrangement of its switching circuit 120' also differs from the switching circuit 120 described above in relation to FIG. 2.

The switching circuit 120' here comprises a group of switches 111, 112, associated with the first capacitor Ca with:

- the first switch element 111 between the first electrode 101*a* of the first capacitor Ca and the first read node $N_{L1}$;
- the second switch element 112 between the second electrode 102*a* of the first capacitor Ca and the detection node $N_D$.

The circuit 120' also includes a group of switch elements 117, 116, associated with the second capacitor Cb with:

- a switch element 117 between a first electrode 101*b* of the second capacitor Cb and the detection node $N_D$;
- a switch element 116 between a second electrode 102*b* of the second capacitor Cb and the first read node $N_{L2}$.

The switching circuit 120' also includes here:

- a switch element 121 between the first electrode 101*a* of the first capacitor Ca and the detection node $N_D$;
- a switch element 122 between the second electrode 102*a* of the first capacitor Ca and the second read node $N_{L2}$;
- a switch element 123 between the first electrode 101*b* of the second capacitor Cb and the detection node $N_D$;
- a switch element 124 between the second electrode 102*b* of the second capacitor Cb and the first read node $N_{L1}$.

A first configuration of the switching circuit 120' is illustrated in FIG. 5A with a first electrode 101*a* of the first integration capacitor Ca coupled with the first read node $N_{L1}$ and a second electrode 102*a* of the same first integration capacitor Ca coupled with the detection node $N_D$. The first electrode 101*b* of the second integration capacitor Cb is then coupled with the detection node $N_D$ and the second electrode 102*b* of this second integration capacitor Cb is coupled with the second read node $N_{L2}$.

For this, the switches 111, 112, 117, 118 are closed (i.e. ON) whereas the switches 121, 122, 123, 124 are open (i.e. OFF).

A second configuration of the switching circuit 120' is illustrated in FIG. 5B with the first electrode 101*a* of the first integration capacitor Ca coupled with the first detection node $N_D$ and the second electrode 102*a* of the same first integration capacitor Ca coupled with the second read node $N_{L2}$. The first electrode 101*b* of the second integration capacitor Cb is then coupled with the detection node $N_D$ and the second electrode 102*b* of this second integration capacitor Cb is coupled with the first read node $N_{L1}$.

To obtain this second configuration, the switches 111, 112, 117, 118 are open (i.e. OFF) whereas the switches 121, 122, 123, 124 are closed (i.e. ON).

Alternating between the first configuration and the second configuration alternately associates: firstly, the capacitors Ca, Cb respectively with the first amplifier A1 and with the second amplifier A2, and secondly, the capacitors Ca, Cb respectively with the second amplifier A2 and with the first amplifier A1 while modifying the polarity of the two capacitors Ca, Cb.

Such an operating mode makes it possible to compensate for any offset that may exist between the transistor M2*b* of the first amplifier A1 and the transistor M2*c* of the second amplifier A2.

Figure 6A:
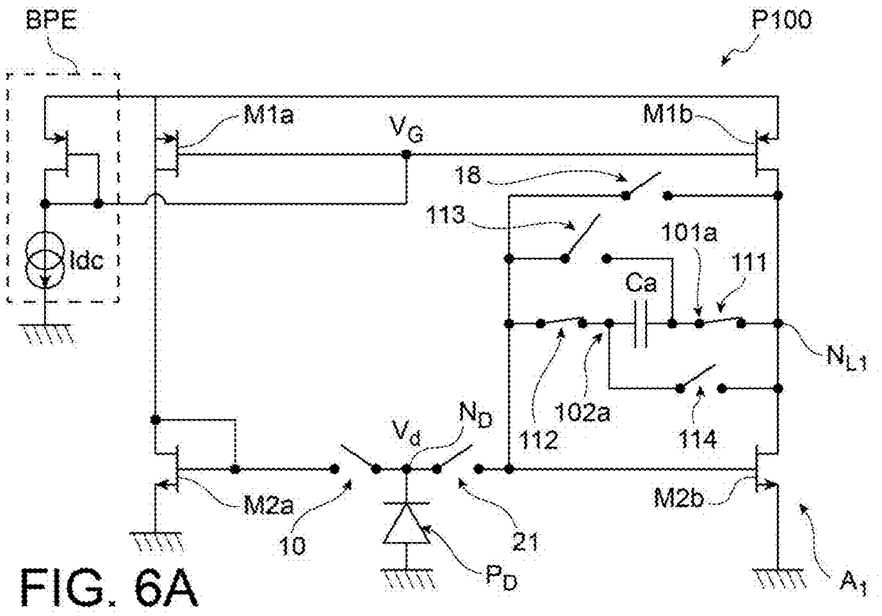
FIGS. 6A and 6B illustrate a third read circuit according to the invention of a depth pixel provided with a single storage element and a switching circuit making it possible to switch the electrodes of its integration capacitor with respect to the amplification stage with which this capacitor is associated.
Figure 6B:
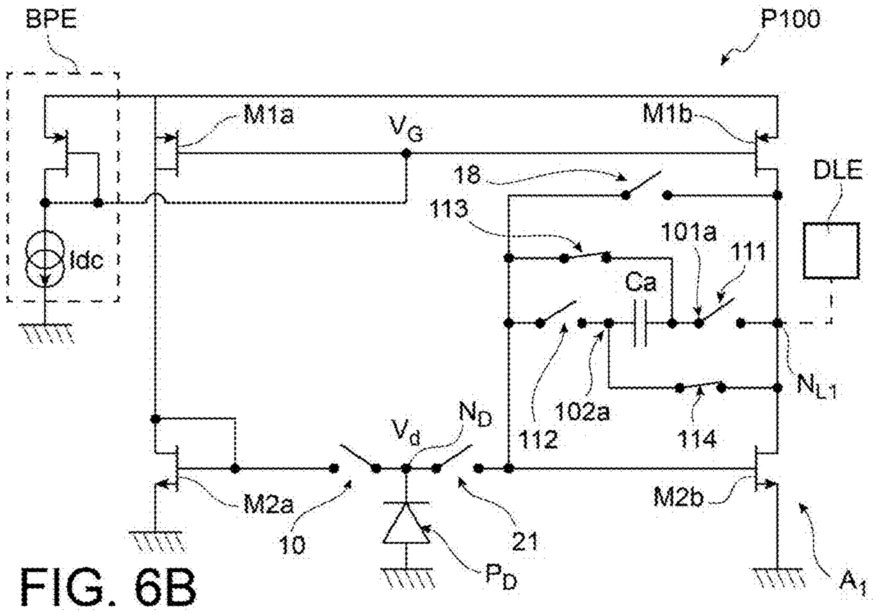

In FIGS. 6A and 6B, another exemplary embodiment of a read circuit of a depth pixel $P_{100}$ is given and differs from that described above in relation to FIG. 2, in particular in that it comprises here a single storage element with here a single integration capacitor Ca, which can make it possible to obtain a reduced size.

The switching circuit 120 here includes switch elements 111, 112, 113, 114, associated with the single integration capacitor Ca with:

- a first switch element 111 between a first electrode 101*a* of the capacitor Ca and the read node $N_{L1}$;
- a second switch element 112 between a second electrode 102*a* of the capacitor Ca and the detection node $N_D$;
- a third switch element 113 between the second electrode 102*a* of the first capacitor Ca and the detection node $N_D$;
- a fourth switch element 114 between the first electrode 101*a* of the first capacitor Ca and the read node $N_{L1}$.

A first configuration of the switching circuit 120, is illustrated in FIG. 6A, with the first electrode 101*a* of the first integration capacitor Ca coupled with the first read node $N_{L1}$ and the second electrode 102*a* of this same first integration capacitor Ca coupled with the detection node $N_D$. For this, the switches 111, 112 are closed (i.e. ON) whereas the switches 113, 114 are open (i.e. OFF). The switching circuit 120, here provided with a single integration capacitor Ca, can be set to such a configuration when the read circuit is in sampling phases by the capacitor Ca.

A second configuration of the switching circuit 120, is illustrated in FIG. 6B with the first electrode 101*a* of the first integration capacitor Ca coupled this time with the detection node $N_D$ and the second electrode 102*a* of the same first integration capacitor Ca coupled with the first read node $N_{L1}$. For this, the switches 111, 112 are open (i.e. OFF) whereas the switches 113, 114 are closed (i.e. ON). The switching circuit 120 provided here with a single integration capacitor Ca can be set to such a configuration when the read circuit is in other sampling phases by the capacitor Ca.

Such a circuit making it possible to reverse the capacitor from one integration to another can, here again, make it possible to compensate for the effects of offsets and parasitic light acquisition.

Figure 7:
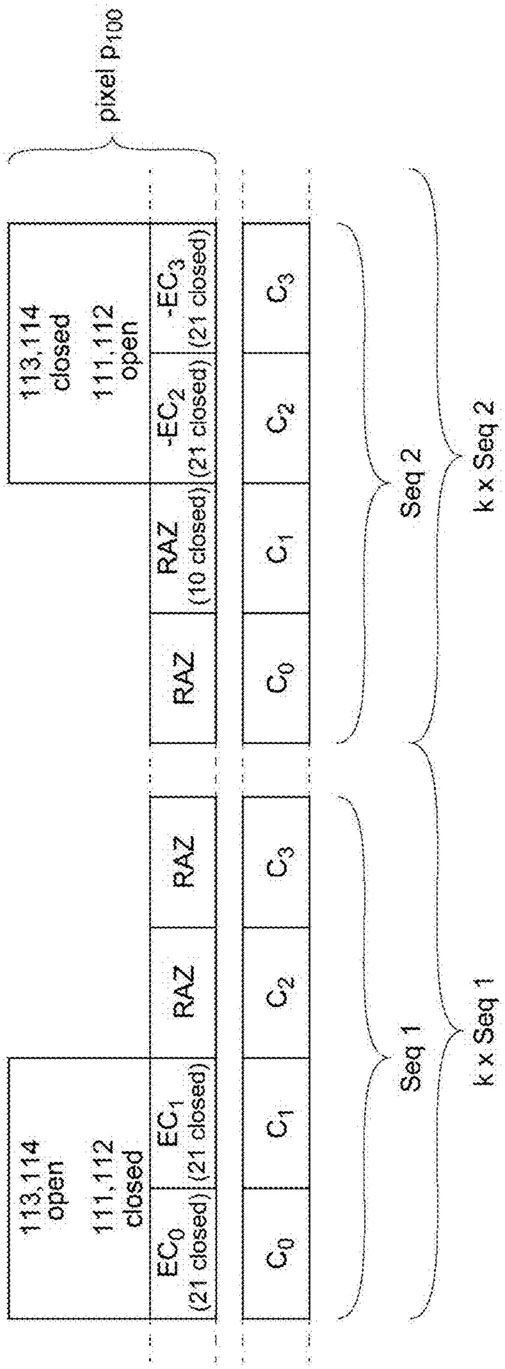
FIG. 7 illustrates a first operating mode of the third circuit during successive sampling sequences.

A first operating mode of such a pixel $P_{100}$ is given in FIG. 7 and serves to illustrate an integration period during which a successive repetition of k times a first sequence seq1, and of k times a second sequence seq2 of sampling is performed. The first sequence Seq1 and the second sequence Seq2 are here again each composed of a first sampling phase C0, a second sampling phase C1, a third sampling phase C2, and a fourth sampling phase C3.

The first sampling phase then the second sampling phase of the first sequence Seq1 are implemented by the same integration capacitor Ca when the switching circuit 120 is in its first configuration and correspond to a collection of samples EC0 and EC1.

A biasing reset RAZ of the photodetector PD of the pixel p100 can then be performed during the third sampling phase C2 and/or the fourth sampling phase C3.

Then, after having performed k times the first sequence Seq1, the third sampling phase C2 and the fourth phase C3 of the second sequence Seq2 are implemented by the first integration capacitor Ca of the pixel p100, and correspond to a second sampling phase of the capacitor Ca when the switching circuit 120 is in its second configuration. A biasing reset RAZ of the photodetector PD of the pixel p100 is then performed during the first sampling phase C0 and the second sampling phase C1. The first sequence thus makes it possible to obtain a value EC0+EC1, whereas, after reversing the capacitor Ca, the second sequence Seq2 makes it possible to obtain the value −EC2−EC3. Following these two successive sequences Seq1, Seq2, a total EC0+EC1−EC2−EC3 can be obtained. As indicated above, a sequence of k times the first sequence Seq1, then k times the second sequence Seq2 is implemented where k is a high number, for example between 5000 and 50,000 times during an integration period.

Figure 8:
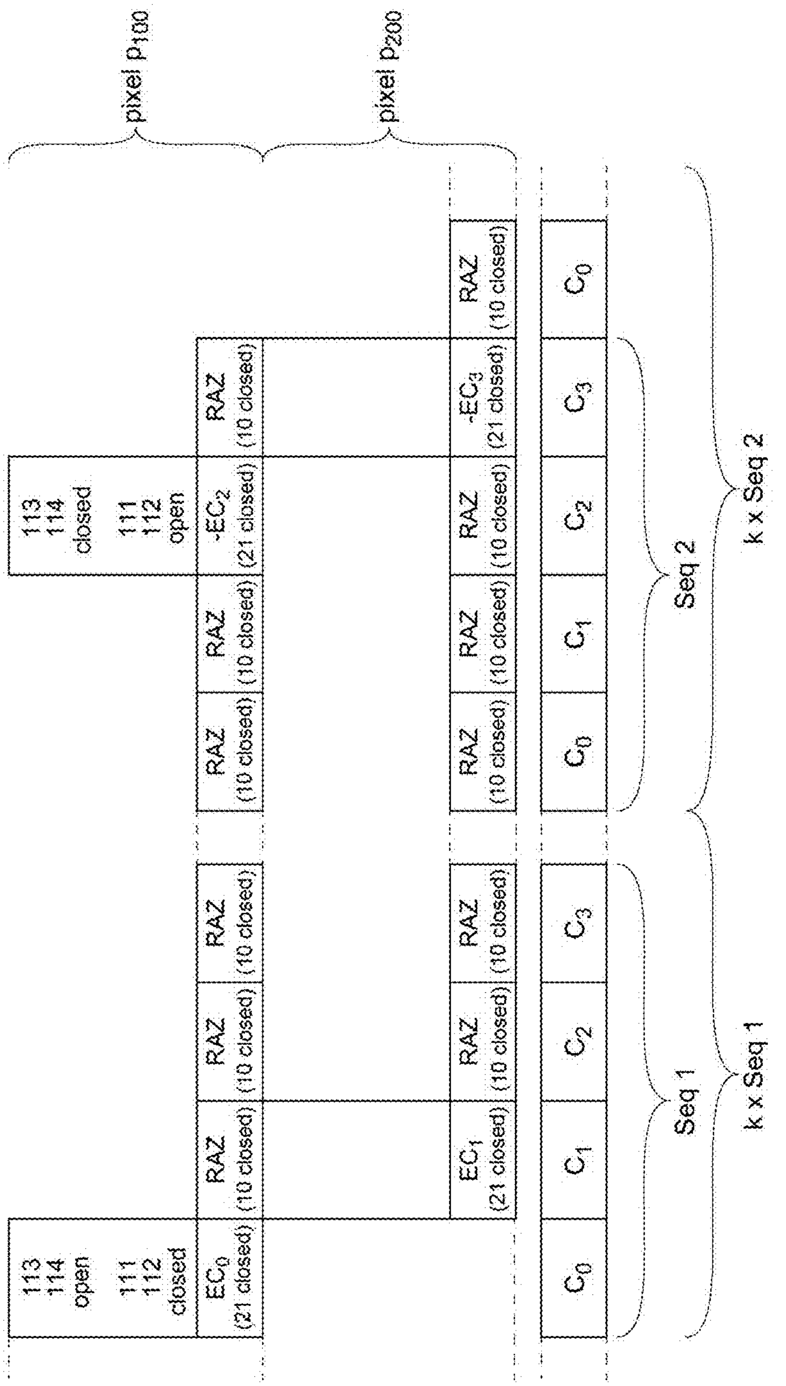
FIG. 8 illustrates a second operating mode of the third circuit during successive sampling sequences.

Other operating modes of the pixel $P_{100}$ can be provided. Thus, another example of an integration period is illustrated in FIG. 8, again with a repetition of k times the first sequence seq1, then of k times the second sequence seq2.

The first sampling phase C0 of the first sequence Seq1 is implemented by the first integration capacitor Ca of the pixel p100 and corresponds to a charge collection by the capacitor Ca when the switching circuit 120 is in its first configuration.

A biasing reset RAZ of the photodetector PD of the pixel p100 can then be performed during the second sampling phase C1, third sampling phase C2 and fourth sampling phase C3.

The third sampling phase C2 of the second sequence Seq2 is implemented by the first integration capacitor Ca of the pixel p100 and corresponds to a charge collection by the capacitor Ca when the switching circuit 120 is in its second configuration. A biasing reset RAZ of the photodetector PD of the pixel p100 is then performed during the first sampling phase C0 of the second sampling phase C1 and the fourth sampling phase C2.

The first sequence thus makes it possible to obtain a value EC0, whereas, after reversing the capacitor Ca, the second sequence Seq2 makes it possible to obtain the value −EC2. A sample total EC0−EC2 can be obtained following these two sequences Seq1, Seq2, whereas another pixel makes it possible to obtain EC1−EC3 following these two sequences Seq1, Seq2.

The invention claimed is:

1. An acquisition device for acquiring depth images of a scene by detecting a reflected light signal corresponding to the reflection on the scene of an incident light signal, the acquisition device being provided with a set of depth pixels, each depth pixel of said set comprising a read circuit associated with a photodetector, the read circuit including a detection node to which the photodetector is connected, the read circuit being provided with:

- a storage element including an integration capacitor configured to acquire samples of charges from the photodetector during sampling phases performed during an integration period including repeated sequences of successive charge sampling phases,
- at least one amplifier stage including at an input, said detection node coupled with the photodetector and at an output, a read node capable of being coupled with an external reading device and common to said set of depth pixels, at least a first pixel of said set of depth pixels being further provided with a switching circuit including switch elements and configured to:

- during sampling phases of the integration capacitor of the first pixel, adopt a first configuration so as to couple a first electrode of said integration capacitor with the read node and a second electrode of the integration capacitor with the detection node, then,
- during other sampling phases of the integration capacitor of the first pixel, adopt a second configuration so as to couple the first electrode of the integration capacitor with the detection node and the second electrode of the integration capacitor with the reading node.

2. The device according to claim 1, wherein said integration capacitor is a first integration capacitor and wherein said amplifier stage is a first amplifier stage, the read circuit further comprising:

- a second integration capacitor,
- a second amplifier stage, the second amplifier stage including at an input, the detection node coupled with the photodetector and at an output, a second read node.

3. The device according to claim 2, wherein, in the first configuration, the first electrode of the first integration capacitor is coupled with the read node and the second electrode of the integration capacitor is coupled with the detection node, and wherein in the second configuration the first electrode of the first integration capacitor is coupled with the detection node and the second electrode of the first integration capacitor is coupled with the read node, the switching circuit being configured to:

- during sampling phases of the second integration capacitor, couple a first electrode of the second integration capacitor with the second read node and a second electrode of the second integration capacitor with the detection node, then
- during other sampling phases of the second integration capacitor, couple the first electrode of the second integration capacitor with the detection node and the second electrode of the second integration capacitor with the second read node.

4. The device according to claim 3, wherein the repeated sequences of successive sampling phases include a repetition of a first sampling sequence followed by a repetition of a second sampling sequence, each of said first sampling sequence and second sampling sequence including a first sampling phase, a second sampling phase, a third sampling phase, and a fourth sampling phase, the first sampling phase of the first sequence and the third sampling phase of the first sequence being performed respectively by the first integration capacitor of the first pixel and by the second integration capacitor of the first pixel, the first sampling phase of the second sequence and the third sampling phase of the second sequence being performed respectively by the first integration capacitor of the first pixel and by the second integration capacitor of the first pixel, the second sampling phase and the fourth sampling phase of the first sequence and of the second sequence being performed by at least one read circuit of at least one other depth pixel of said set.

5. The device according to claim 1, wherein the read circuit is provided with a single integration capacitor and wherein said sampling phases are sampling phases of the integration capacitor during which the first electrode of the integration capacitor is coupled with the read node and the second electrode of the integration capacitor is coupled with the detection node, said other sampling phases being sampling phases during which the first electrode of the integration capacitor is coupled with the detection node and the second electrode of the integration capacitor is coupled with the read node.

6. The device according claim 5, wherein the repeated sequences of successive sampling phases include a repetition of a first sampling sequence then a repetition of a second sampling sequence, the first sampling sequence and the second sampling sequence each including a series of a first sampling phase, a second sampling phase, a third sampling phase, and a fourth sampling phase, the first sampling phase, the second sampling phase, the third sampling phase, the fourth sampling phase having equal durations, the first sampling phase and the second sampling phase of the first sampling sequence being performed by the first pixel in a first switching circuit configuration, the third sampling phase and the fourth sampling phase of the second sampling sequence being performed by the first pixel in the first switching circuit configuration, the third sampling phase and the fourth sampling phase of the first sampling sequence, the first sampling phase and the second sampling phase of the second sampling sequence being performed by at least one read circuit of at least one other depth pixel of said set.

7. The device according to claim 5, wherein the repeated sequences of successive sampling phases include a repetition of a first sampling sequence then a repetition of a second sampling sequence, the first sampling sequence and the second sampling sequence each including a series of a first sampling phase, a second sampling phase, a third sampling phase, and a fourth sampling phase, the first sampling phase, the second sampling phase, the third sampling phase, the fourth sampling phase having equal durations, the first sampling phase of the first sequence being performed by the first pixel, the third sampling phase of the second sequence being performed by the first pixel, the second sampling phase, the third sampling phase and the fourth sampling phase of the first sequence, the first sampling phase, the second sampling phase and the fourth sampling phase of the second sequence being performed by at least one read circuit of at least one other depth pixel of said set.

8. The device according to claim 1, wherein the read circuit of the first pixel further comprises a biasing reset unit for biasing the photodetector, with a rebiasing switch configured to, during biasing reset phases of said photodetector, couple the biasing reset unit with the photodetector so as to apply a biasing potential to it, and to, during the sampling phases performed by the first pixel, decouple the photodetector from the biasing reset unit.

9. The device according to claim 1, the switching circuit including:

a first switch element between the first electrode of the integration capacitor and the read node;

a second switch element between the second electrode of the integration capacitor and the detection node;

a third switch element between the second electrode of the integration capacitor and the detection node;

a fourth switch element between the second electrode of the integration capacitor and the read node.

10. The device according to claim 1, wherein said amplifier stage is formed of:

a first transistor provided with a gate connected to the photodetector and an electrode, in particular a drain electrode, connected to the read node a second transistor mounted as a current source and having a common electrode with the first transistor.

11. The device according to claim 10, wherein said set of depth pixels have an array arrangement, the device further comprising an external biasing unit common to the depth pixels of the same horizontal row or a line of depth pixels, the external biasing unit comprising a circuit portion mounted in current mirror with said second transistor.

12. The device according to claim 1, wherein the read circuit is further provided with a reset switch in parallel with a feedback branch, provided, when it is closed, to reset the integration capacitor prior to said integration period, said reset switch being open during said integration period.

13. The device according to claim 1, wherein the photodetector is an unpinned photodiode based on a III-V material.

14. The device according to claim 1, wherein the photodetector operates in the near infrared.

15. An acquisition device for acquiring depth images of a scene by detecting a reflected light signal corresponding to the reflection on the scene of an incident light signal, the acquisition device being provided with a set of depth pixels, each depth pixel of said set comprising a read circuit associated with a photodetector, the read circuit including a detection node to which the photodetector is connected, the read circuit being provided with:

a storage element including a first integration capacitor configured to acquire samples of charges from the photodetector during sampling phases performed during an integration period including repeated sequences of successive charge sampling phases, an amplifier stage including at the input, said detection node coupled with the photodetector and at the output, a read node capable of being coupled with an external reading device and common to said set of depth pixels, a second integration capacitor, a second amplifier stage, the second amplifier stage including at the input, the detection node coupled with the photodetector and at the output, a second read node, at least a first pixel of said depth pixel set being further provided with a switching circuit including switch elements and configured to:

during sampling phases of the first integration capacitor, adopt a first configuration so as to couple a first electrode of the first integration capacitor with said read node and a second electrode of the first integration capacitor with the detection node, then, during other sampling phases of the first integration capacitor, adopt a second configuration so as to couple the first electrode of the first integration capacitor with the detection node and the second electrode of the first integration capacitor with the second read node at the output of the second amplifier stage of said read circuit, the second amplifier stage including, at the input, said detection node, and at the output, the second read node, said second read node also being capable of being coupled with said external read device.

16. The device according to claim 15, wherein during said sampling phases, the first electrode of the first integration capacitor is coupled with the read node and the second electrode of the first integration capacitor is coupled with the detection node, and wherein during said other sampling phases, the first electrode of the first integration capacitor is coupled with the detection node and the second electrode of the first integration capacitor with the second read node, the switching circuit being configured to:

during sampling phases of the second integration capacitor, couple a first electrode of the second integration capacitor with the second read node and a second electrode of the second integration capacitor with the detection node, then during other sampling phases of the second integration capacitor, couple the first electrode of the second integration capacitor with the detection node and the second electrode of the second integration capacitor with the read node.

17. The device according to claim 16, wherein the repeated sequences of successive sampling phases include a first sampling sequence then a second sampling sequence, the first sampling sequence and the second sampling sequence each comprising a series of a first sampling phase, a second sampling phase, a third sampling phase, and a fourth sampling phase, the first sampling phase, the second sampling phase, the third sampling phase, the fourth sampling phase having equal durations, the first sampling phase and the second sampling phase of the first sequence being performed by a first capacitor of the first pixel, the third sampling phase and the fourth sampling phase of the first sequence being performed by a second capacitor of the first pixel.

18. The device according to claim 17, wherein the second sampling phase and the third sampling phase of the first sequence are performed by a first capacitor of a second pixel, the fourth sampling phase of the first sequence and the first sampling phase of the second sequence being performed by a second capacitor of the second pixel.

19. The device according to claim 17, the switching circuit including:

a switch element between the first electrode of the first integration capacitor and the read node;

a switch element between the second electrode of the first integration capacitor and the detection node;

a switch element between the first electrode of the second integration capacitor and the read node;

a switch element between the second electrode of the second integration capacitor and the detection node;

a switch element between the first electrode of the first capacitor and the detection node;

a switch element between the second electrode of the first capacitor and the second read node;

a switch element between the first electrode of the second capacitor and the detection node;

a switch element between the second electrode of the second capacitor and the read node.

* * * * *